(12) United States Patent
Zeghloul et al.

(10) Patent No.: US 12,478,981 B2
(45) Date of Patent: Nov. 25, 2025

(54) APPARATUS FOR SEPARATING THE COMPONENTS OF A MIXTURE OF FIBRES AND GRANULES BY BEATING THE MIXTURE BY MEANS OF AN ALTERNATING ELECTRIC FIELD

(71) Applicants: Compagnie Generale Des Etablissements Michelin, Clermont-Ferrand (FR); CENTRE NATIONAL DE LA RECHERCHE SCIENTIFIQUE, Paris (FR); ECOLE NATIONALE SUPERIEURE DE MECANIQUE ET D'AEROTECHNIQUE, Futuroscope Chasseneuil (FR); UNIVERSITE DE POITIERS, Poitiers (FR)

(72) Inventors: Thami Zeghloul, Puymoyen (FR); Lucien Dascalescu, Saint Germain en Laye (FR); Karim Medles, Gond Pontoutvre (FR); Thomas Simonelli, Clermont-Ferrand (FR); Christophe Le Clerc, Clermont-Ferrand (FR)

(73) Assignees: Compagnie Generale Des Etablissements Michelin, Clermont-Ferrand (FR); Centre National De La Recharche Scientifique, Paris (FR); Ecole Nationale Superieure De Mecanique Et D'Aerotechnique, Futuroscope Chasseneuil (FR); Universite De Poitiers, Poitiers (FR)

( * ) Notice: Subject to any disclaimer, the term of this patent is extended or adjusted under 35 U.S.C. 154(b) by 0 days.

(21) Appl. No.: 18/833,239

(22) PCT Filed: Feb. 2, 2023

(86) PCT No.: PCT/EP2023/052538
§ 371 (c)(1),
(2) Date: Jul. 25, 2024

(87) PCT Pub. No.: WO2023/152019
PCT Pub. Date: Aug. 17, 2023

(65) Prior Publication Data
US 2025/0108385 A1    Apr. 3, 2025

(30) Foreign Application Priority Data

Feb. 9, 2022    (FR) ........................................ 2201128

(51) Int. Cl.
*B03C 7/06*    (2006.01)
*B03C 7/00*    (2006.01)
*B03C 7/02*    (2006.01)

(52) U.S. Cl.
CPC .............. *B03C 7/026* (2013.01); *B03C 7/006* (2013.01); *B03C 7/06* (2013.01)

(58) Field of Classification Search
USPC ..................................................... 209/127.1
See application file for complete search history.

(56) References Cited

FOREIGN PATENT DOCUMENTS

| CN | 114734555 A | * | 7/2022 | ............ B03C 7/003 |
| FR | 962212 A | | 6/1950 | |

(Continued)

*Primary Examiner* — Terrell H Matthews
(74) *Attorney, Agent, or Firm* — Dickinson Wright PLLC

(57) ABSTRACT

An installation is provided that is intended to separate two families of components of a mixture placed in a receptacle. The installation is provided with a screen and comprises a first electrode, a second electrode, and a generator that generates, between the first and second electrodes, an agitating alternating electrical field. The alternating electrical field is capable of alternately projecting all or some of the components of the mixture that is present in the receptacle towards or against the first electrode and then towards or against the second electrode in order to generate mechanical (Continued)

impacts on the components that contribute to breaking down the mixture within the receptacle and in order to facilitate the passage of components belonging to the second family through the screen. The screen ensures components belonging to the first family are retained in the receptacle.

20 Claims, 3 Drawing Sheets

(56) References Cited

FOREIGN PATENT DOCUMENTS

| FR | 2943561 A1 | * | 10/2010 | ............... | B03C 3/30 |
| FR | 3132448 A1 | * | 8/2023 | ............... | B03C 7/06 |
| JP | 2009233538 A | | 10/2009 | | |
| JP | 2016209796 A | * | 12/2016 | | |

* cited by examiner

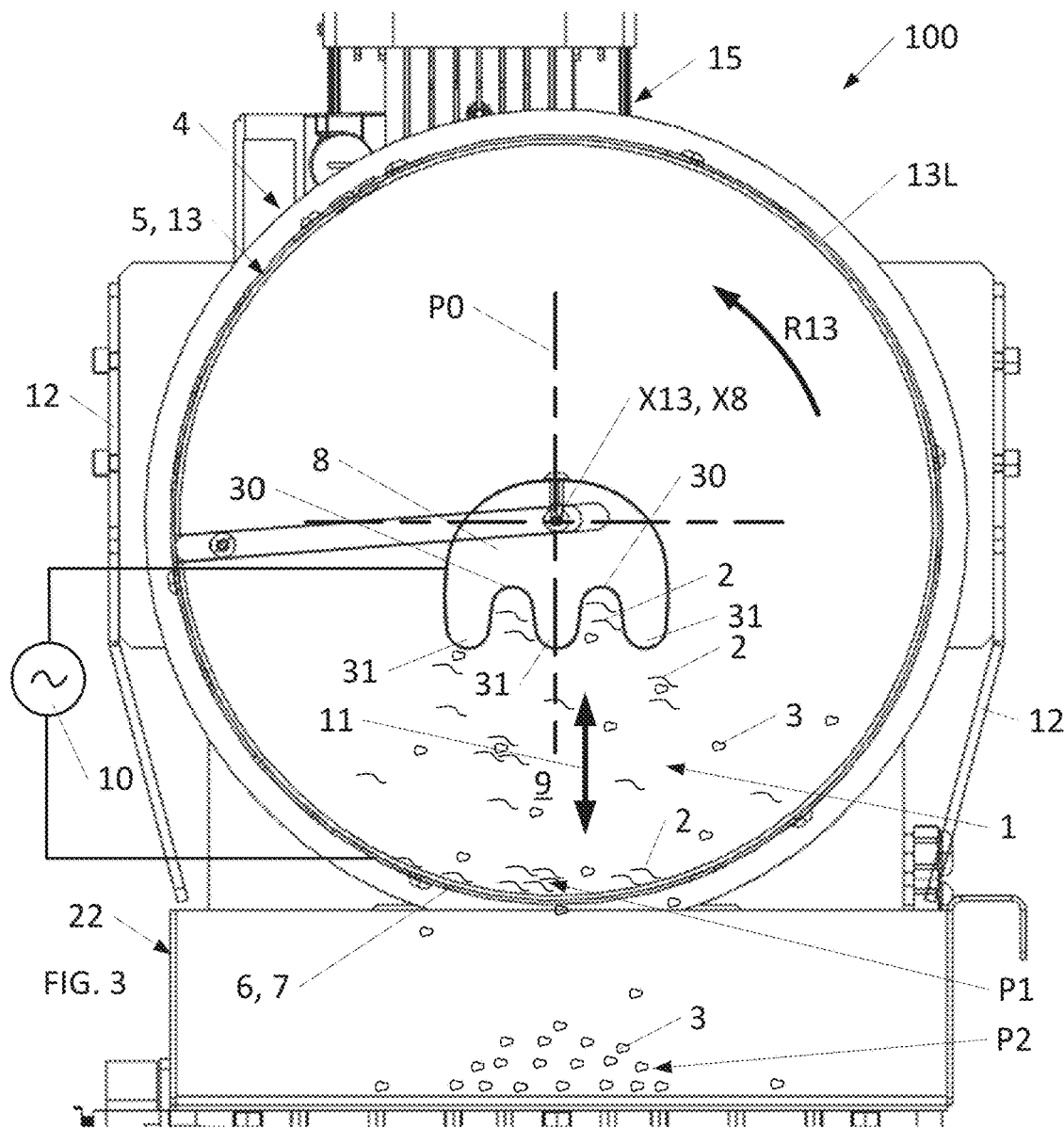
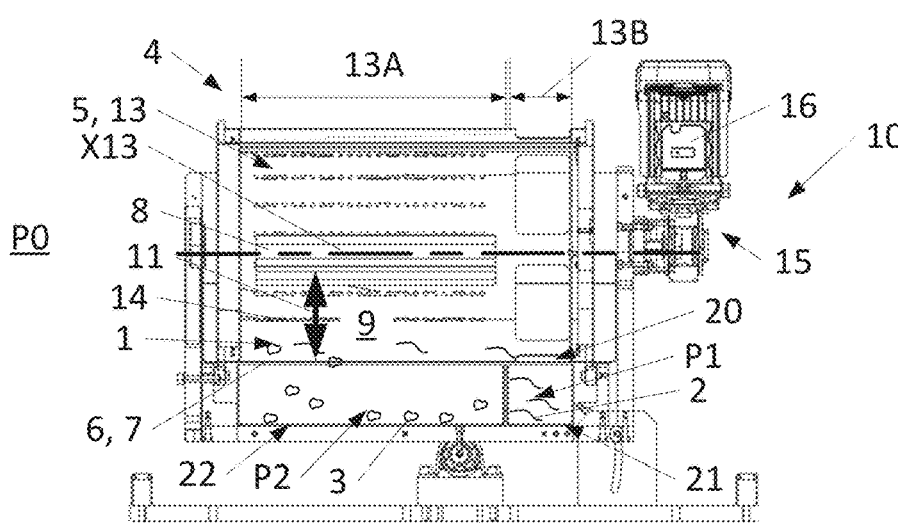

APPARATUS FOR SEPARATING THE COMPONENTS OF A MIXTURE OF FIBRES AND GRANULES BY BEATING THE MIXTURE BY MEANS OF AN ALTERNATING ELECTRIC FIELD

CROSS-REFERENCE TO RELATED APPLICATIONS

This application claims the benefit of and priority to PCT Patent Application No. PCT/EP2023/052538, filed on 2 Feb. 2023, and entitled "APPARATUS FOR SEPARATING THE COMPONENTS OF A MIXTURE OF FIBRES AND GRANULES BY BEATING THE MIXTURE BY MEANS OF AN ALTERNATING ELECTRIC FIELD," and to French Patent Application No. FR 2 201 128, filed on 9 Feb. 2022, and entitled "APPARATUS FOR SEPARATING THE COMPONENTS OF A MIXTURE OF FIBRES AND GRANULES BY BEATING THE MIXTURE BY MEANS OF AN ALTERNATING ELECTRIC FIELD."

BACKGROUND

1. Field

The present disclosure relates to the general field of separation methods and installations intended to separate the various components of a mixture containing at least a first family of components and a second family of components.

2. Related Art

There are numerous methods intended for separating the components of a mixture.

It is notably known, for example from document EP-2 937 200, to mechanically separate the components using a dry process, by subjecting the mixture to screening on a vibrating screen.

It is also known, for example from document FR-2 943 561, to electrostatically separate granular components, by using a tribo-electric effect to give the components an electrostatic charge of which the sign depends on the family of the component, and by subjecting the components thus charged to a continuous electrical field generated between two electrodes, such that each granule is, depending on the sign of its charge, attracted selectively by the corresponding electrode of the opposite sign.

Although such known methods are generally satisfactory, they can suffer from several limitations and drawbacks.

Such known methods may notably have limited effectiveness, in particular when they are used to process mixtures of very heterogeneous composition which contain both granules and fibres, because a certain number of fibres and granules tend to remain clumped together.

Moreover, the energy efficiency of the known separation installations is sometimes mediocre insofar as it is necessary to utilize a relatively high amount of energy to process a given quantity of mixture. For example, when it is necessary to make a screen vibrate, a non-negligible portion of the incoming energy is dissipated by the drive mechanism of the screen, and even the kinetic energy effectively acquired by the screen is not in turn fully converted into a stirring and agitating action capable of individually agitating the various components of the mixture relative to one another, such that, in definitive terms, only some of the incoming energy contributes effectively to the action of breaking up the clumps of components.

SUMMARY

The objects assigned to the disclosure therefore seek to overcome the aforementioned disadvantages and to propose a new separation installation with increased efficiency, notably for the processing of mixtures made up of fibres and granules.

The objects assigned to the disclosure are achieved by means of a separation installation intended to receive a mixture containing at least a first family of components, preferably fibres, and a second family of components, preferably granules, in order to separate the components belonging to the first family from the components belonging to the second family, said installation being characterized in that it has an electrical thrashing chamber which comprises:
  a receptacle, which is designed to receive the mixture and is provided with a screen,
  a first electrode,
  a second electrode placed facing the first electrode at a distance therefrom,
  and a generator for applying an alternating voltage between the first electrode and the second electrode so as to generate, between said first and second electrodes, an alternating electrical field, referred to as "agitating electrical field", which is capable of alternately projecting all or some of the components of the mixture that is present in the receptacle towards or against the first electrode and then towards or against the second electrode, in order to generate mechanical impacts on said components that contribute to breaking down the mixture within the receptacle and in order to facilitate the passage of components belonging to the second family through the screen, while said screen ensures components belonging to the first family are retained in the receptacle.

Advantageously, the present disclosure makes it possible to replace mechanically induced thrashing, which is typical of known installations using vibrating screens, with electrically induced thrashing.

Such an installation thus offers considerably improved energy efficiency, since the electrical power supplied by the generator is directly transmitted to the components themselves, and is therefore directly and immediately converted into effective movement, and thus into kinetic energy, of said components, instead of being converted and dissipated into mechanical energy that causes the screen to move.

Advantageously, the alternating nature of the agitating electrical field makes it possible to agitate the mixture in all directions, by exerting electrical forces, which are oriented alternately in one direction and then in the opposite direction with the rhythm of the frequency of the agitating alternating electrical field, on the components of the mixture, and more particularly on each individual component of the mixture.

Such agitation makes it possible to increase the number, intensity and frequency of the mechanical impacts experienced by the components when said components, under the effect of the alternating agitating movements induced by the agitating electrical field, collide with one another or strike any obstacle that is in their way, such as one or the other of the first and second electrodes, a wall of the receptacle, or more particularly the screen.

Such an increase in the number of impacts makes it easier to break down the clumps of components, notably in the presence of clumps in which fibres and granules are intertwined and/or stick to one another. As a result, the increase in the number of impacts causes and encourages the mixture to break up into separate components, thereby improving the effectiveness of the screening action.

Moreover, such an installation makes it possible to process a given quantity of mixture in a very short time, since setting the components in motion is virtually instantaneous, as soon as the agitating electrical field is activated.

In this regard, the inventors have observed that, by contrast to the known electrostatic separation installations which require at first the components to be given a sufficient electrostatic charge, for example by means of a tribocharger, before being able to then extract the charged components by means of a fixed electrical field, the excitation by an alternating electrical field according to the present disclosure makes it possible to immediately agitate the components, which react as soon as one or the other of the components in question is either polarized, which is to say that said component has a neutral overall charge but within itself exhibits an imbalance in the local distribution of the charges that gives it the properties of a dipole, or charged, which is to say that said component has a positive or negative, non-zero electrical charge of its own. Advantageously, the component reacts to the alternating electrical field even if this polarization or this charge of the component is slight.

The polarization and agitation phenomenon takes place with rapid amplification, by spreading throughout the mixture, under the effect of the agitating alternating electrical field, and lasts as long as the agitating alternating electrical field is maintained.

In other words, the agitating alternating electrical field is enough by itself to cause the components to be set in motion virtually instantaneously, via repeated and relatively unordered movements which are powerful enough to break up the components, on the basis of a mixture of which the components are initially weakly polarized or even unpolarized and/or weakly charged or even uncharged.

BRIEF DESCRIPTION OF THE DRAWINGS

Further subjects, features and advantages of the present disclosure will become apparent in more detail from reading the following description and with the aid of the appended drawings, which are provided purely by way of nonlimiting illustration, in which:

FIG. 3 is a detail view, in frontal section in the vertical section plane of FIG. 2, of the electrical thrashing chamber of the installation of FIGS. 1 and 2.

FIG. 4 is a view, in longitudinal section in a vertical section plane containing the central axis of the screen drum, of the installation of FIGS. 1 to 3.

DETAILED DESCRIPTION OF THE ENABLING EMBODIMENT

Figure 1:
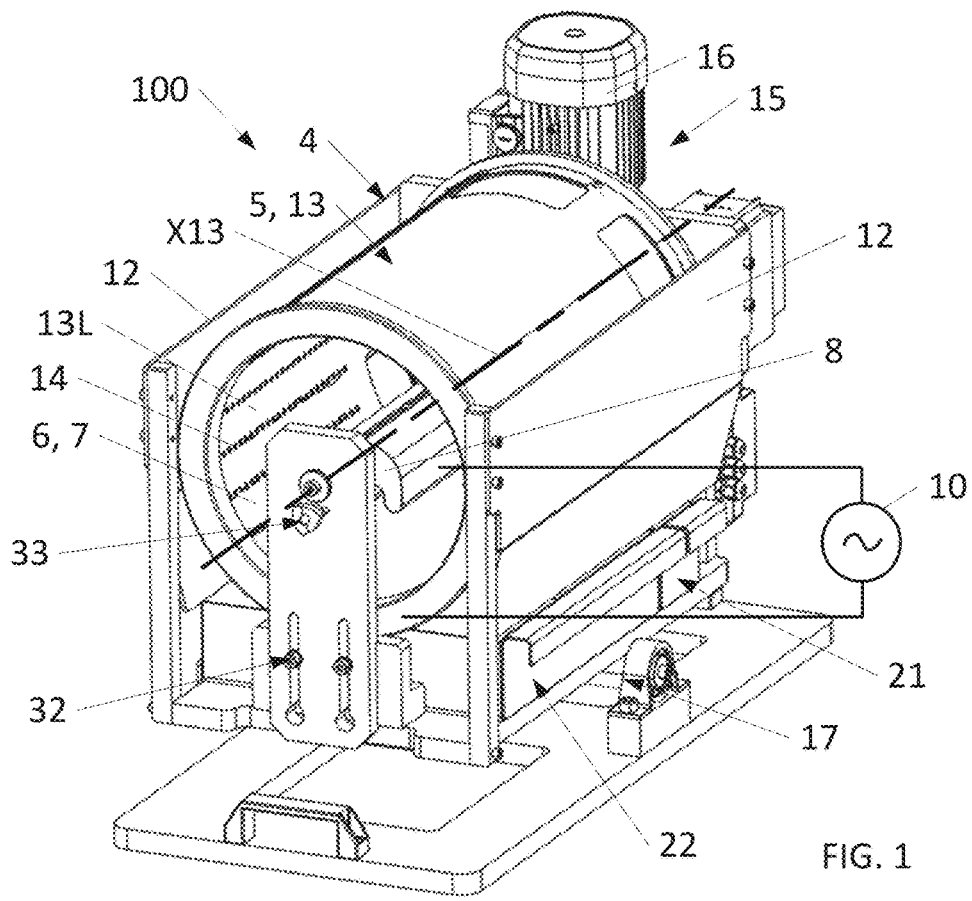
FIG. 1 illustrates an overall perspective view of an example of an installation according to the present disclosure, in which the receptacle containing the mixture is formed by a cylindrical screen drum of which the lateral wall forms both the first electrode and the screen.

The present disclosure is notably applicable in the processing of industrial waste which takes the form of a mixture containing at least two families of components, and in particular in the processing of a mixture containing both fibres and granules, in order to recycle the constituent materials of these components.

The disclosure is more specifically applicable in the processing of mixtures that originate from the shredding of pneumatic tires and contain textile fibres, notably made of polyethylene terephthalate, and granules made of a rubber-based material.

The present disclosure is notably applicable to the processing of mixtures containing components that have a size on the millimetre and sub-millimetre scale, which is to say in particular for the processing of mixtures that contain fibres having a diameter of between 10 µm and 1 mm for a length of between 1 mm and 10 mm, and granules having an equivalent diameter of between 125 µm and 5 mm.

The present disclosure relates to a separation installation 100, such as that illustrated in FIGS. 1 to 5, which is intended to receive a mixture 1 containing at least a first family of components 2 and a second family of components 3 in order to separate the components 2 belonging to the first family from the components 3 belonging to the second family.

The components 2 of the first family are preferably solid components, and more preferably fibres 2, as schematically shown in FIG. 3.

The components 3 of the second family are preferably also solid components, and more preferably granules 3, as schematically shown in FIG. 3.

That being said, the present disclosure can still be applied to very varied mixtures of components 2, 3, and could for example be used for the separation of the components of a mixture that might contain two families of granules having distinct structures or shapes, and/or distinct dielectric constants, and/or distinct chemical compositions, and/or distinct densities.

The components of the first family will preferably be fibres 2. Said fibres 2 will have a thin and elongate, preferably substantially cylindrical shape. For the simple convenience of the description, the components 2 of the first family will therefore be comparable to the fibres 2 in the following text.

At least some, preferably most of said fibres 2 that are present in the mixture 1 (which is to say more than 50% of the total number of fibres present), and more preferably all (100% of the total number of fibres present) of said fibres 2 that are present in the mixture 1, will have a length of between 1 mm and 10 mm, whereas the largest of their transverse dimensions, which is to say the largest of the dimensions considered perpendicularly to their length, which is to say typically the diameter in the case of a cylindrical fibre, will be between 10 µm and 1 mm. The installation 100 will preferably be designed to be able to separate and collect (at least) the fibres having such dimensions.

The fibres 2 will more preferably have a dimension, referred to as length, which is considerably greater than the other two dimensions, referred to as transverse dimensions, and more particularly will have a length at least 5 times, preferably at least 10 times, at least 20 times, or even at least 50 times or even 100 times greater than the largest of these two transverse dimensions, which is to say, typically, in the case of a cylindrical fibre 2, a length at least 5 times, preferably at least 10 times, at least 20 times, or even at least 50 times or even 100 times greater than the diameter of the fibre 2 in question.

The fibres 2 may be made of a natural or synthetic textile material, and more preferably a polymer or a combination of polymers from the following (non-exhaustive) list: polyethylene terephthalate (PET), polyethylene (PE), polypropylene (PP), polyvinyl chloride (PVC) and polystyrene (PS).

Preferably, the components of the second family will be granules 3. For the simple convenience of the description, the components 3 of the second family will therefore be comparable to the granules 3 in the following text.

At least some of the granules 3 that are present in the mixture 1, preferably most of the granules 3 that are present in the mixture 1 (more than 50% of the total number of granules present), and more preferably all of said granules 3 that are present in the mixture 1 (100% of the total number of granules present), will preferably have an equivalent diameter of between 125 µm and 5 mm and, preferably, an aspect ratio of between 1 and 2.

The term "equivalent diameter" denotes the diameter that an imaginary sphere occupying the same volume as the volume occupied by the granule 3 in question would have.

The term "aspect ratio" denotes the ratio between, on the one hand, the maximum Feret diameter, which is to say the maximum distance, observable for the granule 3 in question, between two parallel straight lines that are respectively tangent to opposite sides of said granule 3, and, on the other hand, the minimum Feret diameter, which is to say the minimum distance, observable for the granule 3 in question, between two parallel straight lines that are respectively tangent to opposite sides of said granule in question. This aspect ratio makes it possible to provide a good indication of the slenderness of the granules 3. By way of indication, it will be recalled that an aspect ratio equal to 1 corresponds to a sphere, and an aspect ratio equal to the square root of 2 corresponds to a cube.

The installation 100 will preferably be designed to be able to separate and collect (at least) the fibres 2 having the aforementioned dimensions, and more particularly to be able to sort the fibres 2 having such dimensions and the granules 3 having the aforementioned dimensions, which are initially intermixed in the mixture 1, by separating them.

The installation 100 will preferably make it possible notably to process mixtures 1 which contain a proportion by weight of fibres 2, in relation to the total weight of the mixture 1, of between 5% and 75%, preferably more than 60%, whereas the proportion by weight of granules 3, in relation to the total weight of the mixture 1, represents between 25% and 95%, and preferably less than 40%.

According to the present disclosure, the installation 100 has an electrical thrashing chamber 4.

Said chamber 4 is intended to cause the mixture 1 to undergo a thrashing operation, which is to say to cause the mixture 1 to undergo successive impacts, in this case with respect to a screen 6, to separate the components 2 of the first family from the components 3 of the second family.

This thrashing operation is advantageously a dry process, which is to say it takes place without needing to add any liquid additive, notably a liquid solvent, to the mixture 1 or to immerse said mixture 1 in any solution. The operation can advantageously take place under a gaseous atmosphere, for example under an ambient atmosphere (air), or possibly under a gaseous atmosphere of controlled composition and/or humidity, such as a dry nitrogen atmosphere.

Figure 2:
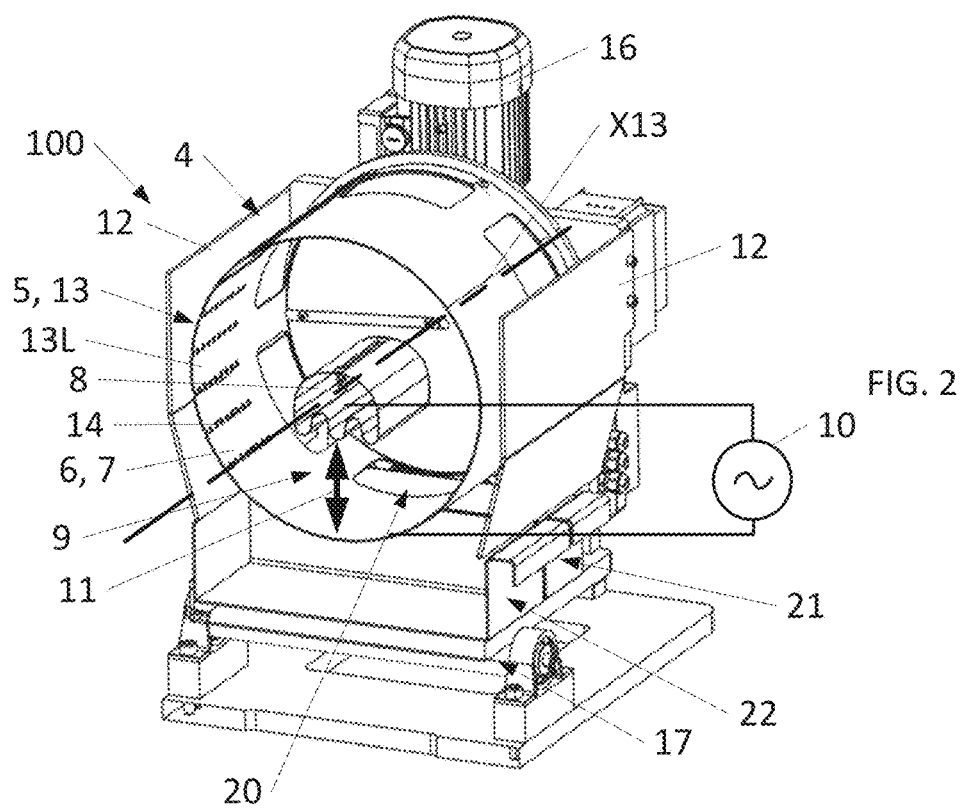
FIG. 2 is a perspective view of the installation of FIG. 1, with cutaway in a vertical section plane which is transverse to the central axis of the screen drum.

According to the present disclosure, and as is notably clearly shown in FIGS. 2 and 3, the electrical thrashing chamber 4 comprises:
  a receptacle 5, which is designed to receive the mixture 1 and is provided with a screen 6,
  a first electrode 7,
  a second electrode 8 placed facing the first electrode 7 at a distance from said first electrode 7,
  and a generator 10 for applying an alternating voltage between the first electrode 7 and the second electrode 8 so as to generate, between said first and second electrodes 7, 8, an alternating electrical field 11, referred to as "agitating electrical field" 11, which is capable of alternately projecting all or some of the components 2, 3 of the mixture 1 that is present in the receptacle 5 towards or against the first electrode 7 and then towards or against the second electrode 8, in order to generate mechanical impacts on said components 2, 3 that contribute to breaking down the mixture 1 within the receptacle 5 and in order to facilitate the passage of components 3 belonging to the second family through the screen 6, while said screen 6 ensures components 2 belonging to the first family are retained in the receptacle 5.

Of course, the receptacle 5 is arranged such that at least some of the mixture 1 present in the receptacle 5, and preferably all the mixture 1 present in said receptacle 5, is situated between the first electrode 7 and the second electrode 8, in the gap 9 defined between said first and second electrodes 7, 8.

Advantageously, the agitating alternating electrical field 11, when it is activated, excites the components 2, 3 present in the gap 9 and exerts electrical forces, which point in directions that are periodically reversed at the frequency of the alternating electrical field, on said components 2, 3 such that said electrical forces point alternately towards the first electrode 7 and then towards the second electrode 8 and so on and so forth, the effect of which is to buffet the components 2, 3 about in the receptacle 5 by imposing multiple repeated changes in direction on said components, in response to the alternations of the agitating electrical field 11 but also in response to the rebounding of the components 2, 3 when said components 2, 3 set in motion in this way strike one another or reach any obstacle within the receptacle 5.

For ease of depiction, the alternations of the agitating electrical field—and therefore the resulting alternations of the forced displacement of the components 2, 3—are symbolized by a double-headed arrow in FIGS. 2, 3, 4 and 5.

These agitating movements given to the components 2, 3, the speed of which depends notably on the frequency and intensity of the agitating alternating electrical field 11, which is to say the frequency and amplitude of said alternating electrical field created by the generator 10, cause multiple repeated impacts on the components 2, 3 and in particular on the clumps which combine, in the mixture initially introduced into the receptacle 5, multiple components 2, 3 belonging to the two families, the effect of which is to break down said clumps and thus facilitate the screening, within the receptacle 5, of the components 2, 3 broken up in this way.

More particularly, the thrashing operation makes it possible to encourage the components 3 of the second family, in this case the granules 3, to pass through the screen 6, because said thrashing operation makes it possible to rattle the mixture 1, and thus in particular the components 3 of the second family, in contact with the screen 6, after said components 3 of the first family have been separated from the components 2 of the second family, in this case entangled fibres 2, which would initially prevent the components 3 of the second family from passing through the mesh M6 of the screen 6.

It is thus possible to collect in the screen 6 a first product P1, referred to as "purified", which originates from the mixture 1 and is enriched with components 2 of the first family, in this case enriched with fibres 2, that is to say which has a greater proportion of components 2 of the first family, in this case a greater proportion of fibres 2, than the initial mixture 1 does.

In absolute terms, it is possible to envisage various arrangements of the receptacle 5, the screen 6 and the first and second electrodes 7, 8, provided that for the one part the mixture 1 placed in the receptacle 5 is exposed in the gap 9 between the electrodes 7, 8 and thus subjected to the agitating electrical field 11, and that for the other part the screen 6 is positioned to receive the components 2, 3 made to move by the agitating electrical field 11 and broken up by the thrashing action resulting from the application of said agitating electrical field 11.

Thus, for example, the receptacle 5 containing the mixture 1, and more preferably the screen 6, will preferably form a wall which is closed on itself around, at least, the second electrode 8. In this way, the mixture 1 will advantageously be thrashed inside a confined space, in the enclosure delimited by the receptacle 5 and containing the second electrode 8, without the risk of the mixture dispersing out of the receptacle 5, notably with said mixture 1 not having been broken up by the thrashing action and subjected to the screening operation.

The screen 6 will particularly preferably form at least one portion, or even all, of the wall of the receptacle 5 surrounding the second electrode 8.

The second electrode 8 will of course be located at a distance from the wall of the receptacle 5, so as to keep a space available between said wall of the receptacle 5 and said second electrode 8 to accommodate the mixture 1 and agitate it.

In absolute terms, use may be made of a first electrode 7 and a second electrode 8, which are both distinct from the screen 6.

According to one possible arrangement, both the first electrode 7 and the second electrode 8 can then be placed inside the receptacle 5, and more particularly inside the screen 6, forming a cage. The components can then alternately strike the first electrode 7 and then the second electrode 8 and fall back, or be projected by rebounding, against the screen 6 which surrounds the gap 9, and more particularly which extends at least partially below said gap 9 in order to be able to receive the components 2, 3 by gravity.

According to another possible arrangement, the first electrode 7 may be placed outside the receptacle 5, and the second electrode 8 inside the receptacle 5, preferably vertically in line with the first electrode 7, such that the wall of the receptacle 5, and more particularly the screen 6, will extend partially between the two electrodes 7, 8, in the gap 9. According to such a configuration, the components 2, 3 subjected to the agitating electrical field 11 will alternately strike the second electrode 8 and then the wall of the receptacle 5, and more particularly the screen 6.

However, according to a particularly preferred arrangement variant, the screen 6 itself forms the first electrode 7.

The first electrode 7 is thus preferably integrated in the structure of the screen 6 and more preferably coincides with the structure of the screen 6.

The gap 9 then corresponds to the empty space which extends between the second electrode 8 and the screen 6, and thus more particularly between the second electrode 8 and the wall of the receptacle 5 in which the screen 6 is integrated.

Such an arrangement is advantageously particularly simple and compact. It is also relatively insensitive to fouling, and advantageously makes it possible to process a significant volume of the mixture 1 very effectively.

Such an arrangement also makes it possible to cause the components 2, 3 of the mixture 1 to speed up and strike the screen 6, by virtue of the action of the agitating electrical field 11, and to mix the mixture 1, subjected to the electrical agitation, in direct contact with the screen 6, thereby promoting the screening action which makes it possible to allow the components 3 of the second family, in this case the granules 3, to selectively escape out of the receptacle 5, through the screen 6, whereas the components 2 of the first family, in this case the fibres 2, are retained inside the receptacle 5 by the screen 6.

Furthermore, the wall of the receptacle 5, and more particularly the screen 6, preferably has a concave shape with respect to the second electrode 8, more preferably a curved concave shape, preferably a cylindrical shape of which the base forms a circular arc or even a complete circle, so as to promote the redirection of the components 2, 3 subjected to the agitation by the alternating electrical field 11 towards the second electrode 8, notably when said components 2, 3 rebound against the inner surface of the wall of the receptacle 5, this inner surface facing the second electrode 8.

Moreover, such a recessed shape of the wall of the receptacle 5, and more particularly of the screen 6, makes it possible, when said wall or said screen 6 extends below the second electrode 8, to keep the mixture 1 in the gap 9, substantially vertically in line with the second electrode 8, by the simple effect of gravity.

By way of indication, the length of the gap 9, which is to say the distance between the first electrode 7 and the second electrode 8 in the portion of the receptacle 5 receiving the mixture 1, in this case more particularly the vertical distance between the screen 6 and the second electrode 8, is preferably between 30 mm and 200 mm, or between 30 mm and 150 mm, for example between 30 mm and 60 mm. Such a distance range makes it possible both for the one part to form a volume of accommodation and movement which is spacious enough to process a significant quantity of mixture 1 and for the other part to apply an agitating electrical field 11 which has sufficient intensity to give the components 2, 3 the desired thrashing movement.

Furthermore, the electrical thrashing chamber 4 is preferably delimited by the casing panels 12 separating said chamber 4, and thus in particular the receptacle 5 and the electrodes 7, 8, from the external surroundings of the installation 100, notably to contain the components 2, 3 of the processed mixture 1 within the installation 100, and thus avoid said components 2, 3 dispersing into the surroundings. The casing panels 12 may notably comprise lateral panels and an upper cover (the latter having been omitted in the figures for better visibility).

The first electrode 7, and more particularly the screen 6 forming said first electrode 7, is preferably connected to the same mass as the generator 10, and more preferably is connected to earth.

Such an assembly is particularly simple and reliable, and makes it possible to apply to the second electrode 8 a voltage of which the sign changes from positive to negative (and then back again) with each alternation, relative to the first electrode 7 which represents the reference potential, in this case a zero potential. It is also possible to easily generate in the gap 9, relative to the first electrode 7 and thus more preferably relative to the screen 6, an agitating electrical field 11 of which the sign alternates with the frequency of the voltage supplied by the generator 10.

The first electrode 7, and more particularly the screen 6 forming said first electrode 7, is covered with a layer of electrically insulating material.

The term "electrically insulating material" in this case denotes a material which has a resistivity equal to or greater than $10^{10}$ Ω·m at a temperature of 300 Kelvin.

The insulating layer may take for example the form of a coating, for example made of PTFE or PET, preferably with a thickness of between 10 μm and 100 μm, which will be deposited on the core of the electrode 7, which itself is made of metal, for example made of a copper alloy, aluminium alloy or stainless steel.

Advantageously, the insulating layer makes it possible to avoid the formation of electrical arcs between the first electrode 7 and the second electrode 8, and more particularly between the screen 6 and the second electrode 8, thereby making it possible to apply an agitating electrical field 11 of high intensity without the risk of damaging the installation 100 or the components 2, 3 of the mixture 1.

Subsequently, and more particularly when the first electrode 7 is connected to earth, the insulating layer makes it possible to avoid an exchange of charges between said first electrode 7 and the components 2, 3 which come into contact with the surface of said first electrode 7 during the thrashing action. This avoids depolarization or a loss of charge of the components 2, 3 when they touch the first electrode 7, and more particularly the screen 6. In this way, the effectiveness of the action of the agitating electrical field 11 on said components 2, 3 is preserved and optimized.

Analogously, it will optionally be possible to coat the second electrode 8 with a layer of electrically insulating material.

According to a particularly preferred configuration, the receptacle 5 is formed, as shown in FIGS. 1 to 4, by a cylindrical screen drum 13, preferably having a circular base cross section, said screen drum 13 being delimited by a tubular lateral wall 13L which extends along and around a central axis X13.

By way of indication, the inside diameter of the screen drum 13 may preferably be between 200 mm and 1000 mm, for example between 200 mm and 400 mm.

With preference, at least one portion of the lateral wall 13L of the screen drum 13 forms the screen 6.

The screen 6 may be formed by a grid, or a set of grids, integrated in the lateral wall 13L, or else, as illustrated in FIGS. 1, 2 and 4, by a series of holes 14 made through the radial thickness of the lateral wall 13L.

The screen 6 preferably occupies, in azimuth around the central axis X13, a total angular sector of at least 120 degrees, so as to extend over at least one third of the perimeter of the lateral wall 13L, preferably at least 240 degrees, or even 360 degrees so as to extend over all of the perimeter of the lateral wall 13L.

Furthermore, the first electrode 7 is preferably integrated in the lateral wall 13L of the screen drum 13.

The second electrode 8 is then for its part preferably accommodated inside the screen drum 13, at a radial distance from the lateral wall 13L surrounding said second electrode 8.

The lateral wall 13L thus delimits an enclosure which is closed around the central axis X13, and thus around the second electrode 8, thereby notably making it possible to keep the mixture 1 trapped in said enclosure during the thrashing action, as already indicated above.

"Axial" denotes a direction parallel to the direction of the axis in question, in this case the central axis X13.

"Radial" denotes a direction perpendicular to the axis in question, in this case the central axis X13.

Figure 6:
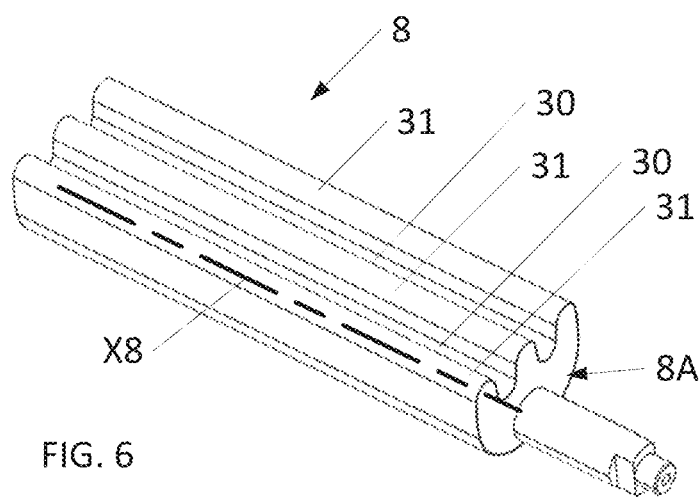
FIG. 6 illustrates a perspective view of an example of a second electrode used by the installation of FIGS. 1 to 5.

As clearly shown in FIGS. 2 and 6, the second electrode 8 may preferably be in the form of a cylindrical profile obtained by sweeping a base cross section 8A along a straight-line segment, referred to as "generatrix segment" X8, which is normal to said base section 8A.

The second electrode 8 is preferably positioned within the screen drum 13 parallel to the central axis X13, which is to say such that its generatrix segment X8 is parallel to the central axis X13.

The overall dimensions of the base cross section 8A of the second electrode 8 are such that said second electrode 8 is contained inside an imaginary measurement cylinder of which the central axis coincides with the generatrix segment X8 of the cylindrical profile of the second electrode and of which the radius is between 25% and 75% of the inner radius of the screen drum 13, for example between 30% and 45% of the inner radius of the screen drum 13.

More preferably, when the second electrode 8 is positioned within the installation 100, it is contained inside an imaginary measurement cylinder which is centred on the central axis X13 and of which the radius is between 30% and 75% of the inner radius of the screen drum 13, for example between 50% and 65% of the inner radius of the screen drum 13, such that said second electrode 8 is substantially centred on the base cross section of the screen drum 13, at a distance from any point on the lateral wall 13L of the screen drum 13.

The second electrode 8 and the lateral wall 13L of the screen drum 13, and more particularly the second electrode 8 for the one part and that portion of the lateral wall 13L that forms the screen 6 and the first electrode 7 for the other part, axially overlap, which is to say occupy a common axial zone, and preferably an identical axial zone, along the central axis X13, as shown notably in FIG. 4.

By way of indication, the second electrode 8, and thus the gap 9 defined radially in line (in this case vertically in line) with said second electrode 8 and enabling the electrical thrashing action, may thus preferably extend over an axial zone which represents at least 25%, preferably at least 50%, or even at least 65% of the total axial length of the screen drum 13.

Furthermore, according to a preferred feature, the installation 100 may comprise a drive system 15 designed to drive the screen drum 13 in rotation R13 on itself, around its central axis X13.

This drive system 15 is moved by a motor 16, preferably an electric motor 16.

Advantageously, the rotation R13 of the screen drum 13 in relation to the frame of the installation 100, and thus in relation to the second electrode 8 which for its part is preferably fixed in relation to the frame of the installation 100, makes it possible to obtain several useful effects.

The first effect is to ensure additional mechanical mixing of the components 2, 3 in contact with the screen 6, in addition to the thrashing movements induced by the agitating electrical field 11, which additional mechanical mixing promotes the screening action.

A second possible effect is a tribocharging effect, which makes it possible to use friction to give the components 2, 3, depending on the nature of the components 2, 3, an electrostatic charge which will increase the electrical forces exerted by the agitating electrical field 11 on the components 2, 3 in question, and thus the agitation effect of said components 2, 3.

A third possible effect is to encourage the transport of the mixture along the central axis X13, so as to make it possible to discharge the first product P1 retained by the screen 6 and, more generally, to make it possible to process a continuous flow of incoming mixture 1.

It will be noted that, to this end, the central axis X13 of the screen drum 13 is preferably inclined relative to the horizontal along a slope with a non-zero angle less than 30 degrees, such that the screen drum 13 can progressively convey the mixture 1 along the central axis X13 in an upstream-downstream direction which corresponds to the direction of the descending slope.

The slope angle may preferably be regulated by means of an inclination adjusting mechanism 17 of the rocking plate 17 type.

The screen 6 is preferably situated in an upstream section 13A of the screen drum 13, while the screen drum 13 has an outlet 20 in a downstream section 13B.

The outlet 20 will be intended to discharge the components retained by the screen 6 out of the screen drum 13. Said outlet 20 may for example, as shown in FIGS. 1, 2 and 4, have windows cut out through the radial thickness of the lateral wall 13L, in the downstream section 13B. These windows will of course be strictly wider than the mesh M6 of the screen 6 which precedes them along the central axis X13.

Furthermore, the installation 100 will preferably comprise a supply device (not shown), of the hopper or Archimedes screw type, which makes it possible to supply mixture 1 to the electrical thrashing chamber 4, and more particularly to discharge said mixture 1 continuously, or in successive batches, in the receptacle 5, in this case in the upstream portion 13A of the screen drum 13.

The installation 100 preferably comprises, for the one part, a first collector 21 facing the outlet 20 of the screen drum 13 for receiving a first product P1 which originates from the mixture and which has a higher proportion of components 2 of the first family, in this case a higher proportion of fibres 2, than the mixture 1 does, and, for the other part, a second collector 22 facing the screen 6, in this case below said screen 6, in order to receive a second product P2 which originates from the mixture and which has a higher proportion of components 3 of the second family, in this case a higher proportion of granules 3, than the mixture 1 does.

The first and second collectors 21, 22 will preferably be arranged underneath the receptacle 5, preferably in this case underneath the screen drum 13, or underneath the downstream section 13B and underneath the upstream section 13A of said screen drum 13, so as to be able to receive the components 2, 3 from the receptacle 5 by gravity.

The first and second collectors 21, 22 may take the form of trays, disposed underneath the screen drum 13.

The first and second collectors 21, 22 may each be associated with an extraction conveyor (not shown), such as a belt conveyor, which is designed to discharge the product P1, P2 collected by the collector 21, 22 in question out of the chamber 4, and more generally out of the installation 100. Such conveyors will advantageously enable continuous operation of the installation 100.

According to a preferred feature, the second electrode 8 has, facing the first electrode 7, or more particularly facing the screen 6, a non-flat shape comprising at least one concave portion formed by a recessed notch 30 framed by two protruding lobes 31.

The second electrode 8 may more preferably have, as clearly shown in FIGS. 2, 3 and 6, two concave portions formed by two adjacent notches 30 delimited by a succession of three lobes 31.

The inventors have specifically noted that a substantially wavy, non-flat shape of the second electrode, and more particularly a concave shape of the base cross section 8A, which alternates one or more recesses (the notches 30) and protruding elements (the lobes 31) would promote an increase in the number of impacts and rebounds of the components 2, 3 in multiple directions, and thus encourage the clumps to break down.

The inventors have also noted that, during the processing of a mixture of fibres 2 and granules 3, such a shape of the second electrode 8 would promote a build-up of particularly pure fibres 2 in the recesses of the notches 30 under the action of the agitating electrical field 11, thereby facilitating the discharge of the granules 3 through the screen and the formation of a particularly well-purified first product P1, which is very rich in fibres 2, in the receptacle 5.

The installation 100 will preferably have one or more adjusting mechanisms for modifying the (fixed) position of the second electrode 8 relative to the first electrode 7, and more particularly to modify the (fixed) position of the second electrode 8 relative to the central axis X13 of the screen drum 13.

The installation 100 may notably have a position adjusting mechanism 32 which will make it possible to modify, in translation in a plane normal to the central axis X13, the position of the second electrode 8 relative to the origin formed by the central axis X13, which is to say the positive or zero eccentricity of the second electrode 8 relative to the screen drum 13, and more particularly which will make it possible to modify the height of the second electrode 8 relative to the screen drum 13, notably relative to the portion forming the bottom point of the radially inner face of the screen drum 13 in the plane in question, and thus relative to the surface of the screen 6 that retains the components.

Figure 5:
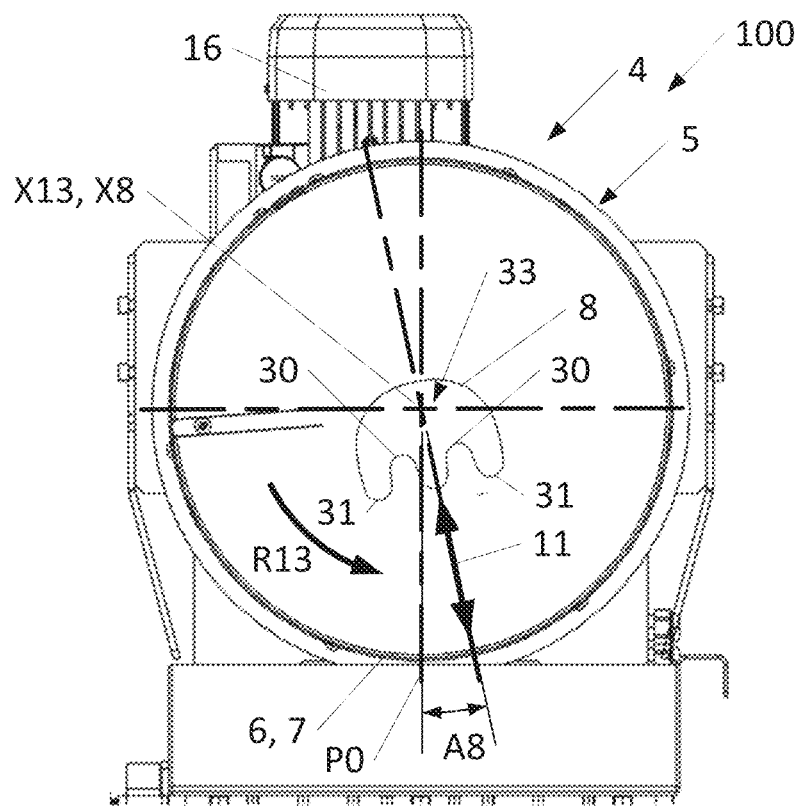
FIG. 5 illustrates a schematic frontal view of the principle of adjusting the azimuthal orientation of the second electrode as a function of the direction of rotation of the screen drum.

The installation preferably has an orientation adjusting mechanism 33 which makes it possible to modify the azimuthal orientation A8 of the second electrode 8 in roll about an axis parallel to the central axis X13 of the screen drum 13, and more preferably about said central axis X13 of the screen drum 13, in order to orient the one or more notches 30 of the second electrode 8 in a direction which is oblique in relation to the vertical, in the direction which corresponds to the direction of rotation R13 of the screen drum 13, as shown in FIG. 5.

Advantageously, the wavy surface of the electrode 8, and more particularly the one or more notches 30, may thus point, with respect to a vertical reference plane P0 containing the central axis X13, towards a side of said vertical reference plane P0 which corresponds to the side where the mixture 1 present in the receptacle 5 tends to build up under the effect of the rotation R13 of the screen drum 13, thereby making it possible to orient the agitating electrical field 11 towards the zone where, potentially, the greatest thickness of mixture 1 on the screen 6 is. This makes it possible to optimize the effectiveness of the electrical thrashing, and more generally the combination of the electrical thrashing and the rotary mechanical mixing.

The second electrode 8 preferably has a sagittal plane which contains the generatrix segment X8, and in relation to which the lobes 31, and the one or more notches 30, have a symmetrical arrangement.

The orientation adjusting mechanism 33 will then preferably make it possible to rock this sagittal plane with respect to the vertical reference plane P0 containing the central axis X13 of the screen drum 13, as shown in FIG. 5, preferably by using a pivot axis coinciding with said central axis X13 of the screen drum 13.

The frequency of the alternating voltage applied by the generator 10, and therefore the frequency of the agitating electrical field 11, is preferably selected to be equal to or greater than 5 Hz, and preferably between 7 Hz and 200 Hz.

Advantageously, a relatively high frequency causes frequent changes in direction of the electrical forces exerted on the components 2, 3, and therefore both very jerky and rapid acceleration and agitation of the components 2, 3, this both increasing the frequency of the mechanical impacts experienced by the components 2, 3 and also increasing the speed and thus the kinetic energy of the components 2, 3 and consequently the intensity of said impacts, which has the effect of very effectively breaking up the clumps.

The peak intensity of the alternations of the agitating electrical field 11, considered at a point situated on a virtual straight-line segment corresponding to the shortest distance between the first electrode 7 and the second electrode 8, in this case at a point of the gap 9 where the mixture 1 is exposed to the thrashing action, is preferably between 200 kV/m and 1000 kV/m.

This makes it possible to have an agitating electrical field 11 which is powerful enough to force the alternating, and thus jerky, displacement of the components 2, 3 present in the receptacle 5 and located in the gap 9, notably when the gap 9 has a length comprised within the range of values indicated above.

The peak amplitude of the alternating voltage applied by the generator 10 between the electrodes 7, 8 will, of course, be adapted as a result.

By way of indication, the generator 10 will preferably supply an alternating voltage the peak value of which is between 10 kV and 60 kV.

The mesh M6 of the screen will, of course, be adapted to the shapes and dimensions of the components 2, 3.

The mesh M6 of the screen (6) is preferably between 1 mm and 10 mm, and more preferably between 2 mm and 5 mm.

The holes 14 made in the lateral wall 13A of the screen drum 13 will typically have a diameter equal to this mesh M6.

Of course, the present disclosure also relates as such to a separating method which implements an operation using an alternating electrical field 11 to thrash a mixture 1 of components 2, 3.

Such a method is preferably implemented by means of an installation 100 according to any one of the features described above.

Thus, the present disclosure relates to a separating method for, on the basis of a mixture 1 containing at least a first family of components 2, preferably fibres 2, and a second family of components 3, preferably granules 3, separating the components 2 belonging to the first family from the components 3 belonging to the second family, said method for this purpose comprising a supplying step (S1), during which the mixture 1 is introduced into a receptacle 5 provided with a screen 6, an electrical thrashing step (S2), during which the components 2, 3 of the mixture 1 that is present in the receptacle 5 are agitated by means of an alternating electrical field, referred to as "agitating electrical field" 11, so as to subject said components 2, 3 to mechanical impacts to break them up, and a screening step (S3), during which the mixture 1 subjected to the electrical thrashing step (S2) is made to pass over the screen 6 in order to retain a first product P1, which originates from the mixture 1, in the receptacle 5, which first product P1 has a higher proportion of components 2 of the first family than the mixture 1 does, while a second product P2, which originates from the mixture 1, is discharged through the screen 6, which second product P2 has a higher proportion of components 3 of the second family than the mixture 1 does.

As indicated above, this separating method, and more particularly the electrical thrashing step (S2), is a dry process, and aims more specifically to separate the components 2, 3, which are in the solid state, from one another.

Advantageously, the use of an alternating electrical field 11 to excite the mixture 1 is particularly effective and energy efficient, since it immediately triggers the setting in motion of the components 2, 3 without requiring notably tribocharging beforehand.

The agitating electrical field 11 is preferably generated by applying an alternating voltage between the screen 6, forming a first electrode 7, and a second electrode 8 placed inside the receptacle 5, at a distance from the screen 6.

As indicated above, this makes it possible to implement the method by means of a particularly simple and compact structure, the receptacle 5 forming a type of cage within which the components are buffeted by the agitating alternating electrical field 11 so as to repeatedly and relatively chaotically strike sometimes the second electrode 8 and sometimes the screen 6 which makes it possible to extract all or some of the components 3 of the second family from the receptacle 5.

The method is preferably applied to a mixture comprising fibres 2, preferably made of polyethylene terephthalate, as first family of components, and granules 3, preferably made of a rubber-based material, as second family of components.

With preference, at least some of the fibres 2 have a length equal to or greater than a first predetermined reference value L2, whereas at least some of the granules 3 have an equivalent diameter which is equal to or less than a second predetermined reference value L3 strictly less than the first reference value L2.

Use can then preferably be made of a screen 6 of which the mesh M6 is between the first reference value L2 and the second reference value L3; and more particularly is such that:

$$L3 < M6 < L2.$$

In the present instance, and notably in connection with the dimensions of the components 2, 3 described above, use may notably be made of a screen 6 of which the mesh M6 is between 1 mm and 10 mm, and more preferably between 2 mm and 5 mm.

According to a particularly preferred possible application, the subject disclosure relates to a method for recycling a pneumatic tire, said method comprising a shredding step, during which at least a portion of said pneumatic tire, for example all or some of the tread of said tire, is reduced to a mixture 1 containing textile fibres 2 and granules 3 made of a rubber-based material, and then a sorting step, during which a separating method according to the present disclosure is applied to said mixture 1, in accordance with the description above.

Of course, the subject disclosure is in no way limited only to the exemplary embodiments described above, a person skilled in the art being notably capable of isolating or freely combining one or another of the aforementioned features, or of substituting them with equivalents.

The invention claimed is:

1. A separation installation intended to receive a mixture containing at least a first family of components and a second family of components in order to separate the components belonging to the first family from the components belonging to the second family, said installation having an electrical thrashing chamber which comprises:
   a receptacle, which is designed to receive the mixture and is provided with a screen,
   a first electrode,
   a second electrode placed facing the first electrode at a distance therefrom,
   and a generator for applying an alternating voltage between the first electrode and the second electrode so as to generate, between said first and second electrodes, an agitating electrical field that is capable of alternately projecting all or some of the components of the mixture that is present in the receptacle towards or against the first electrode and then towards or against the second electrode, in order to generate mechanical impacts on said components that contribute to breaking down the mixture within the receptacle and in order to facilitate the passage of components belonging to the second family through the screen, while said screen ensures components belonging to the first family are retained in the receptacle.

2. The separation installation according to claim 1, wherein the screen forms the first electrode.

3. The separation installation according to claim 1, wherein the first electrode is connected to the same mass as the generator.

4. The separation installation according to claim 1, wherein the first electrode is covered by a layer of electrically insulating material.

5. The separation installation according to claim 1, wherein the receptacle is formed by a cylindrical screen drum, preferably having a circular base cross section, said screen drum being delimited by a tubular lateral wall which extends along and around a central axis, wherein the installation comprises a drive system designed to drive the screen drum in rotation on itself about its central axis, wherein at least one portion of the lateral wall of the screen drum forms the screen, wherein the first electrode is integrated in said lateral wall, and wherein the second electrode is accommodated inside the screen drum, at a radial distance from the lateral wall surrounding said second electrode.

6. The separation installation according to claim 5, wherein the central axis of the screen drum is inclined relative to the horizontal along a slope with a non-zero angle less than 30 degrees, such that the screen drum can progressively convey the mixture along the central axis in an upstream-downstream direction which corresponds to the direction of the descending slope, wherein the screen is situated in an upstream section of the screen drum, while the screen drum has an outlet in a downstream section, and wherein the installation comprises, for the one part, a first collector facing the outlet of the screen drum for receiving a first product which originates from the mixture and which has a higher proportion of components of the first family than the mixture does, and, for the other part, a second collector facing the screen, below said screen, in order to receive a second product which originates from the mixture and which has a higher proportion of components of the second family than the mixture does.

7. The separation installation according to claim 1, wherein the second electrode has, facing the first electrode, a non-flat shape comprising at least one concave portion formed by a notch framed by two lobes.

8. The separation installation according to claim 7, further including an orientation adjusting mechanism which makes it possible to modify the azimuthal orientation of the second electrode in roll about an axis parallel to the central axis of the screen drum in order to orient the one or more notches of the second electrode in a direction which is oblique in relation to the vertical, in the direction which corresponds to the direction of rotation of the screen drum.

9. The separation installation according to claim 1, wherein the frequency of the alternating voltage applied by the generator and the frequency of the agitating electrical field are selected to be equal to or greater than 5 Hz.

10. The separation installation according to claim 1, wherein the peak intensity of the alternations of the agitating electrical field, considered at a point situated on a virtual straight-line segment corresponding to the shortest distance between the first electrode and the second electrode, is between 200 kV/m and 1000 kV/m.

11. The separation installation according to claim 1, wherein the mesh of the screen is between 1 mm and 10 mm.

12. A separating method for, on the basis of a mixture containing at least a first family of components and a second family of components separating the components belonging to the first family from the components belonging to the second family, said method for this purpose comprising a supplying step (S1), during which the mixture is introduced into a receptacle provided with a screen, an electrical thrashing step (S2), during which the components of the mixture that is present in the receptacle are agitated by means of an agitating electrical field so as to subject said components to mechanical impacts to break them up, and a screening step (S3), during which the mixture subjected to the electrical thrashing step (S2) is made to pass over the screen in order to retain a first product, which originates from the mixture, in the receptacle, which first product having a higher proportion of components of the first family than the mixture does, while a second product, which originates from the mixture, is discharged through the screen, which second product has a higher proportion of components of the second family than the mixture does.

13. A separating method according to claim 12, wherein the agitating electrical field is generated by applying an alternating voltage between the screen, forming a first electrode, and a second electrode placed inside the receptacle, at a distance from the screen.

14. The separating method according to claim 12, wherein the method is applied to a mixture comprising fibres as first family of components and granules as second family of components, wherein at least some of the fibres have a length equal to or greater than a first predetermined reference value, wherein at least some of the granules have an equivalent diameter which is equal to or less than a second predetermined reference value strictly less than the first reference value, and wherein use is made of a screen of which the mesh is between the first reference value and the second reference value.

15. A method for recycling a pneumatic tire comprising a shredding step, during which at least a portion of said pneumatic tire is reduced to a mixture containing textile fibres and granules made of a rubber-based material and then a sorting step, during which a separating method according to claim 12 is applied to said mixture.

16. The separation installation as set forth in claim 1, wherein the first family of components are fibres.

17. The separation installation as set forth in claim 1, wherein the second family of components are granules.

18. The separation installation as set forth in claim 8, wherein the at least one concave portion includes two concave portions formed by two adjacent notches delimited by a succession of three lobes.

19. The separation installation as set forth in claim 8, wherein the axis parallel to the central axis of the screen drum is the central axis of the screen drum.

20. The separation installation as set forth in claim 9, wherein the frequency of the alternating voltage applied by the generator and the frequency of the electric field are in the range of 7 Hz and 20 Hz.

* * * * *